Oct. 16, 1934.   C. F. CRUMB ET AL   1,977,429
TRACTOR MOWER
Filed March 19, 1934   3 Sheets-Sheet 1

Inventors
Charles F. Crumb
and Samuel E. Hillstom
By V. F. Gussagne
Atty.

Oct. 16, 1934.  C. F. CRUMB ET AL  1,977,429
TRACTOR MOWER
Filed March 19, 1934   3 Sheets-Sheet 3

Inventors
Charles F. Crumb
and Samuel E. Hilblom
By
Atty.

Patented Oct. 16, 1934

1,977,429

UNITED STATES PATENT OFFICE 1,977,429

TRACTOR MOWER

Charles F. Crumb and Samuel E. Hilblom, Chicago, Ill., assignors to International Harvester Company, a corporation of New Jersey Application March 19, 1934, Serial No. 716,301

13 Claims. (Cl. 56—25)

The invention relates to mowers, and especially to mower attachments for tractors.

The objects of the invention are to provide an improved mower of this type in which a hand lever for adjusting or raising the cutter bar is assisted by a foot lever on the tractor; to provide a flexible connection between said levers; to provide means for maintaining the flexible connection taut in the normal cutting position of the mower; to provide means for automatically disconnecting said flexible connection from one of the levers when the mower is obstruction released; to provide means to support a coupling element clear of the ground when the mower is obstruction released and swings back; to provide an improved means for steadying the attachment to its support to prevent vibration; to provide a novel coupling arm so constructed as to enable easy removal of the pitman from its flywheel without removing the said coupling arm; and, lastly, generally to refine and improve the design and operation of such mowers.

These objects are achieved by the example of the invention chosen for purposes of illustration in the accompanying sheets of drawings, in which:

Figure 5 is a detail sectional view through the gearing, as seen along the line 5—5 appearing in Figure 4 and looking in the direction of the arrows; and, Figure 6 is an enlarged, fragmentary detail view, in side elevation, to show the means for supporting the coupling element clear of the ground when the mower is released.

Figure 4:
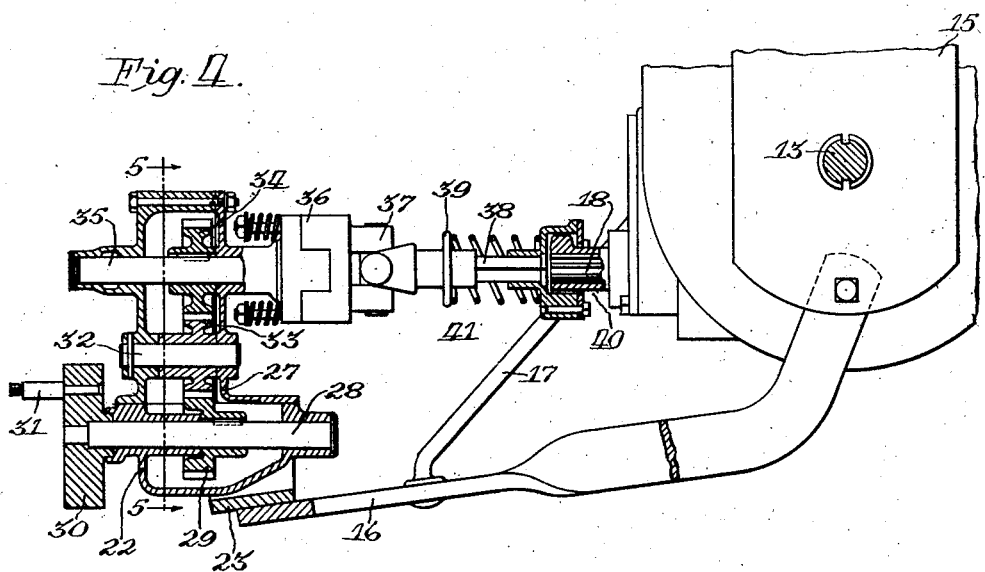
Figure 4 is a longitudinal sectional view through the drive structure from the power take-off shaft of the tractor to the mower flywheel.

The tractor shown is of a well known general purpose type having a frame 10 supported at its front end on a steering truck 11, while at its rear end is a transverse rear housing 12 enclosing an axle 13 on the ends of which are mounted a pair of traction wheels 14. Spaced equi-distantly from the center line of the tractor, the rear axle housing 12 carries a pair of vertically disposed plates 15, to which are respectively connected the legs of a U-shaped drawbar or supporting frame 16, the two legs of which are further supported by hangers 17 connected betweeen the legs of the support and the plates 15. Further, the tractor has the usual centrally and rearwardly extending power take-off spline shaft 18, which is driven in the usual way from the transmission of the tractor. See Figure 4. An operator's seat 19 is carried at the rear end of the tractor, as shown.

The mower attachment for this tractor is of the release bar type, by which is meant that the attachment is pivotally mounted at one point and releasably connected at another point, the releasable connection being an overload release device which is operative when the cutter bar strikes an obstruction with sufficient force. The mower herein shown is of the right-hand-cut type; that is, the cutter bar is disposed transversely and rearwardly to the right of the right hand traction wheel of the tractor. Thus, the attachment is saved from damage when striking an obstruction by swinging about its pivot, rearwardly and horizontally.

Figure 3:
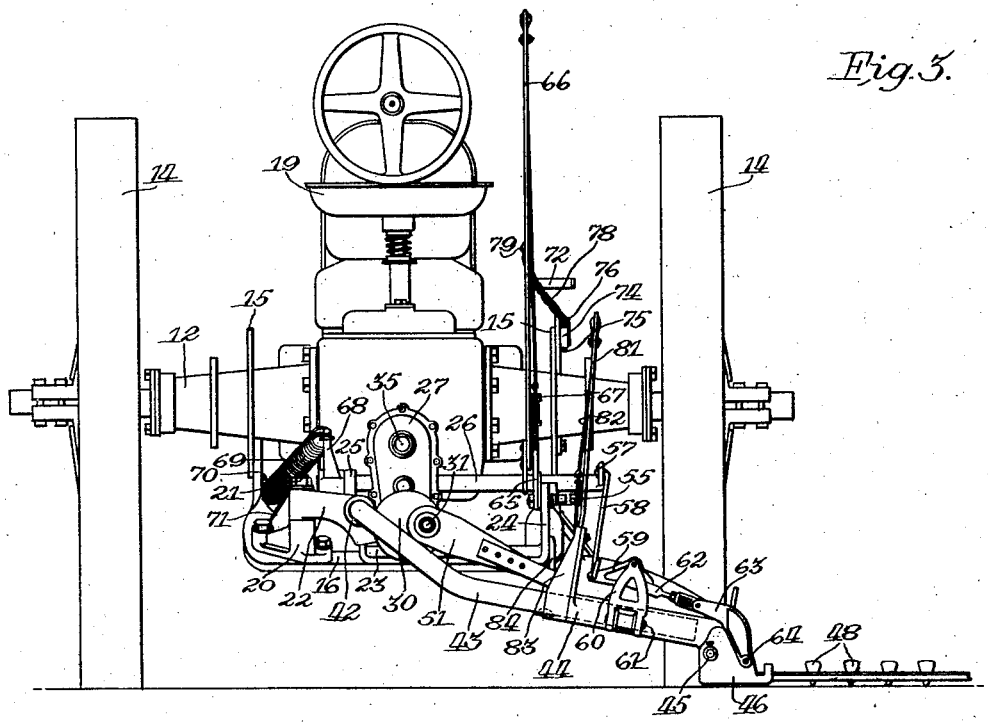
Figure 3 is a rear elevational view.

The transverse bight of the U-support 16 at its left hand end carries a fixed bracket 20, as shown in Figure 3, in which bracket is a vertically disposed pivot bolt 21, to which is pivotally connected the frame 22 of the attachment. Rigidly connected with this frame piece 22 is a transverse plate 23, which overlies the bight of the U-support 16 and extends to the grassward, or right hand, end thereof, where it is upturned to form a bracket 24. The upper end of this bracket 24, and a journal 25 on the bracket 22, serve rockably to mount a transverse shaft 26 for a purpose later to be described.

Formed with the bracket 22 is the lower half of an upright gear box 27 having journaled in its lower end a longitudinal shaft 28 (see Figures 4 and 5) carrying within the box a spur gear 29, said shaft protruding rearwardly out of the box, where it carries and turns a flywheel 30 having an eccentric pin 31. Said housing 27 has its lower end appropriately secured to the plate 23. Directly above the shaft 28, the box 27 carries an intermediate shaft on which turns a gear 33 in mesh with the gear 29, the gear 33 in turn meshing with and being driven from a gear 34 fast on an upper rotatable shaft 35 in the box and in longitudinal alignment with the power take-off shaft 18 of the tractor. The front end of the last mentioned shaft 35 extends out of the box 27 where it is connected through an overload release clutch coupling 36 and universal joint 37 with a longitudinally disposed square shaft 38 having a collar 39 and a drive coupling 40, the latter having a pull-out, splined connection with the power take-off spline shaft 18 on the tractor. A spring 41 encircling the shaft 38 and backed against the collar 39 sets up a force normally urging the coupling 40 onto the spline shaft 18 to maintain a driving connection. It will be understood now that the shafting and gearing just described are for the purpose of driving the mower flywheel 30 from the power take-off shaft of the tractor.

A sleeve 42 is formed longitudinally in the bracket 20 adjacent the stubbleward, or left-hand, edge of the upright case 27. Said sleeve 42 rockably or pivotally journals the longitudinally bent end of a transversely disposed coupling arm 43, said arm being bent downwardly, as viewed from the rear, and, as shown in Figure 3, for a purpose later to appear. This coupling arm 43 extends to a point substantially to the rear of the right-hand traction wheel 14 and there rockably carries at its free end a coupling yoke 44, to which is pivotally connected by a longitudinal pivot pin 45, a shoe 46, which shoe in the usual way has rigidly connected to it the mower cutter bar 47 having the usual guards 48, knife 49, and knife head 50. A pitman 51 is connected at one end to the knife head and at its other end to the eccentric pin 31 on the flywheel 30.

Figure 1:
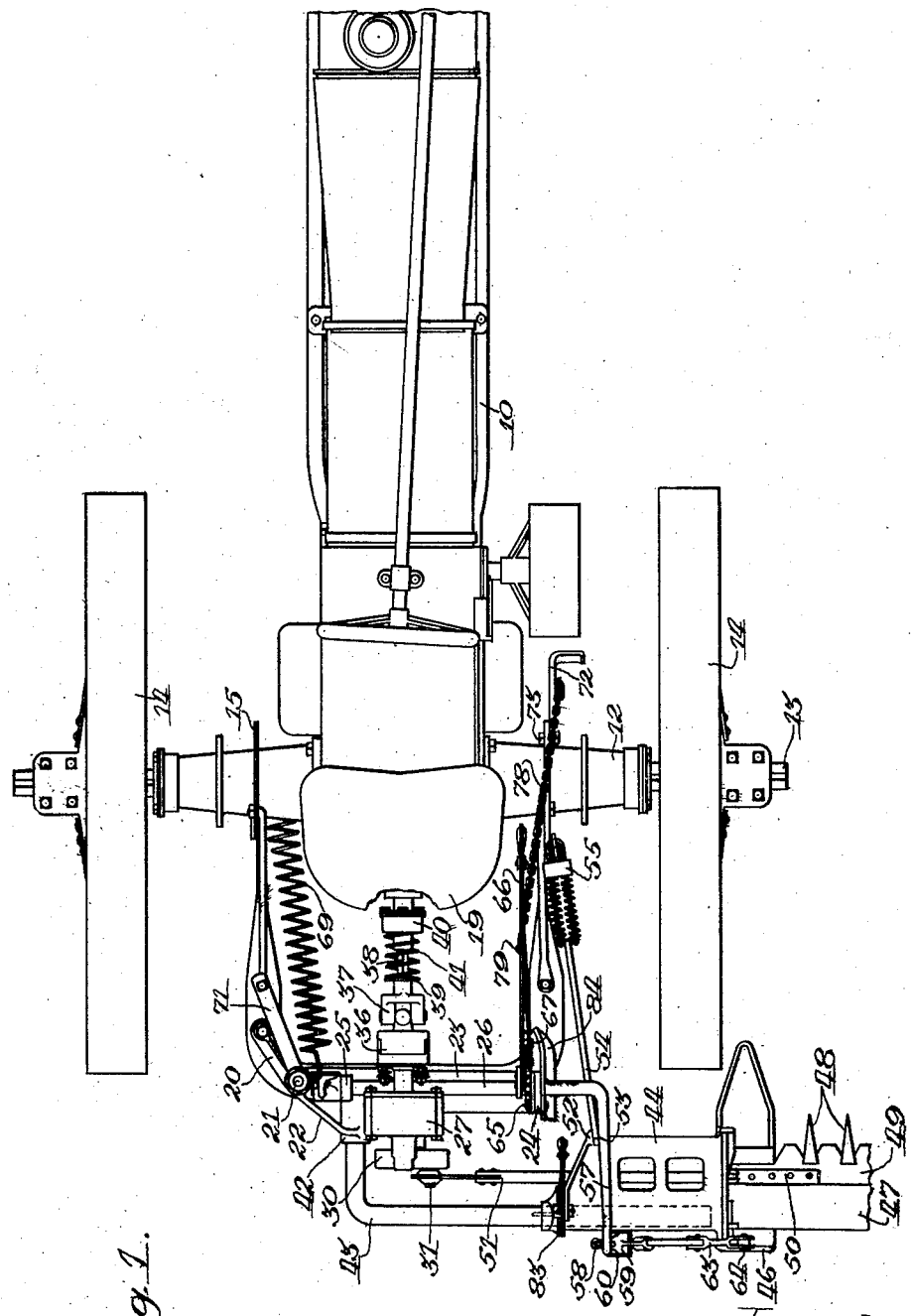
Figure 1 is a plan view of a tractor with the mower attached thereto in its normal, or cutting, position.
Figure 2:
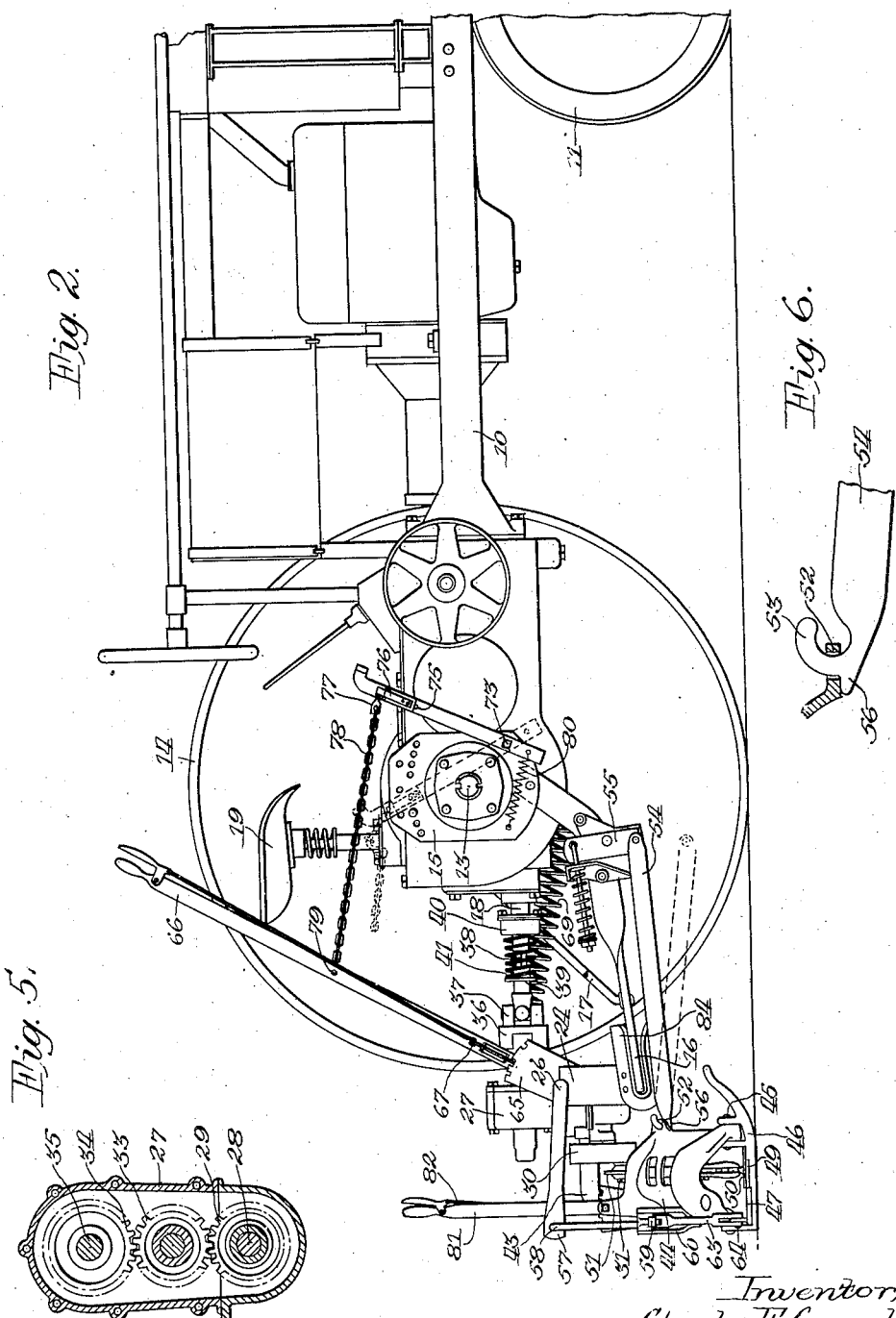
Figure 2 is a general side elevational view of the tractor and mower as shown in Figure 1.

A forward point on the yoke 44 is formed as a flat apertured extension 52, as shown in Figures 2 and 6, the aperture therein pivotally receiving the hook-shaped end 53 of a coupling rod or bar 54, which has its front end releasably connected, as in Pearson Patent 1,911,388, of May 30, 1933, to a spring pulled latch lever 55, which is pivotally mounted on the right hand, or grassward, leg of the U-support 16. Thus, the element 54 normally maintains the transverse cutting position of the mower bar 47, the spring release latch 55 being strong enough to make the pivot 21 inoperative. Should the bar 47 strike a field obstruction, however, with sufficient force to overcome the spring pressure on the latch 55, then the latch lever 55 pivots to the rear, below its fulcrum, causing the forward end of the rod or bar 54 to be released from the latch lever 55, whereupon the entire mower attachment, under the force of draft, is free to, and does, swing backwardly about the pivot pin 21 to save the mower apparatus from damage. The rear end of the rod 54, as shown in Figure 6, has formed adjacent and below the hook 53 a boss 56 adapted to engage the under side of the flat extension 52 to limit the downward pivotal movement of the said rod 54. In fact, the boss 56 engages the extension 52 when the front end of said rod 54 is released from the latch lever 55 to prevent its downward movement. Thus, when the rod is freed, during release of the mower attachment, said rod 54 will be automatically supported in a raised position clear of the ground to prevent it from digging into the ground in an obvious manner.

The cutter bar 47 can be adjusted or raised to plain lift position by hinging it upwardly about its pivot 45 to the coupling yoke 44 by mechanism now to be described. The grassward end of the rockshaft 26 is formed with a rearwardly extending crank 57. A link 58 is pivotally connected to the rear end of said crank 57 and to the stubbleward end of a transverse pivoted bracket 59 carried in a supporting yoke 60 pivoted at 61 to the yoke 44. A link 62 is pivoted to the bracket 59, the link 62 in turn being pivotally connected to a lift arm 63 pivoted at 64 to the shoe 46 grasswardly beyond the pivot 45 of the shoe to the yoke 44. A notched quadrant 65 is bolted to the upright bracket 24 heretofore described. A long hand lever 66 is secured to the rockshaft 26 adjacent the quadrant, so that movement of the lever will rock the shaft, there being a usual form of detent lever lock mechanism 67 on the lever cooperable with the notches in the quadrant to hold the lever in the selected position of adjustment. The other, or stubbleward, end of the shaft 26 has a casting formed to make a crank 68 to which a tension spring 69 is connected, said spring being extended forwardly and having its front end connected to a bracket 70 on the stubbleward leg of the U-support 16. A brace 71 steadies the whole pivot assembly 21. The spring 69 exerts a force to aid lifting of the cutter bar and counterbalances the weight thereof. The rear end of the spring 69 is anchored in close proximity to the pivot 21, so that the spring is not interfered with when the attachment is released and swings back.

While the hand lever 66 is in a convenient position for operation relative to the driver on his seat 19, it is desirable to aid the lever 66 in performing its lift function, and accordingly a foot lever 72 is pivotally mounted on the tractor in a convenient position adjacent the seat 19, said lever being fulcrumed at 73 and extending a distance therebelow, as best shown in Figure 2. As shown in Figures 2 and 3, the foot lever near its upper end carries a socket member 74 which slidably carries a pin 75 releasably held in the socket by a flat spring 76. The upper end of the pin is bent back to form an eye piece 77 to which is connected a flexible element such as a chain 78, the chain at its other end being anchored to the hand lever 66 at 79. A spring 80 connects between the body of the tractor and the extended end of the lever 72 below its fulcrum, whereby the spring exerts a force to keep the chain 78 taut between the two levers 66 and 72.

The tilt of the cutter bar 47 and its guards 48 is adjustably fixed by means of a hand lever 81 fixed to an upstanding portion of the coupling yoke 44, said lever having a detent lock 82 cooperating with a toothed quadrant 83 made fast in any suitable manner to the coupling arm 43. Rocking of the coupling yoke 44 by the lever 81 tilts the cutter bar in a manner well understood in the art.

In attaching the mower to the tractor, the U-support 16 may be considered to be a part of the mower attachment and in applying it to the tractor, all that is necessary to do is to connect the legs of the U-support to the rear end of the tractor in an obvious manner; or, if the support 16 is already on the tractor and is not to be considered a part of the mower attachment, then the bracket 20, arm 22 and structure connected therewith will have to be set on and connected to the support 16 in the manner described. The bar 54 will have to be coupled with the latch 55 and the coupling 40 slid onto the spline shaft 18 of the tractor. To steady the attachment on the support against whipping or vibration in use, an angle bar is bent into a close U to form a grip member 84, which is secured to the grassward side of the bracket 24 in such position that the member 84 will embrace the support 16, as shown in Figure 5.

In cutting, the operator is on the tractor seat where he can manipulate the hand lever 66 to raise the cutter bar over obstructions, and he may use the foot lever 72 to increase the leverage. Should the bar 47 strike a hidden obstruction with sufficient force, then the rod 54 is released from the latch 55, permitting the mower to swing back about its pivot 21; the grip 84 merely sliding free of the support 16; the coupling 40 disconnecting and sliding from the spline shaft 18 to stop the cutter bar drive; and, the pin 75 pulling out of its socket 74 on the lever 72 as the chain 78 tilts back the lever 72 to the dotted line position shown in Figure 2. As the mower structure swings back, the hand lever 66 moves back with it, thus causing the chain 78 to pull the foot lever 72 back in the manner described and shown. With the pin 75 out and the chain thus freed at one end, the mower structure with the hand lever 66 is free to swing backwardly. As the front end of the coupling member 54 is freed from its latch, the boss 56 becomes operative to support the member 54 clear of the ground.

As viewed from the rear (Figure 3), it will be seen that the downward bent angle in the coupling arm 43 has great utility, as it makes possible disconnection of the pitman 51 from the pin 31 on the flywheel 30 without removing the coupling arm 43 from the bracket 22.

From the description given, it is now clear that an improved tractor mower has been provided, which achieves the desirable objects heretofore recited.

It is the intention to cover such changes and modifications as do not materially depart from the spirit and scope of the invention.

What is claimed is:

1. A mower attachment for a tractor having a support at its rear end, said attachment comprising a frame mounted on the support, a coupling arm pivoted to the frame, a yoke on the coupling arm, a cutter bar hingedly associated with the yoke, a lever on the frame having connections to raise the cutter bar, and a second lever pivotally mounted on the tractor and having flexible connection with the first lever whereby operation of the second lever assists operation of the first lever.

2. A mower attachment for a tractor having a support at its rear end, said attachment comprising a frame mounted on the support, a coupling arm pivoted to the frame, a yoke on the coupling arm, a cutter bar hingedly associated with the yoke, a hand lever on the frame having connections to raise the cutter bar, and a foot lever mounted on the tractor and flexibly connected to the hand lever to assist the same in raising the cutter bar.

3. A mower attachment for a tractor having a support at its rear end, said attachment comprising a frame pivotally connected at one point to the support and releasably connected at another point to the support, whereby the frame may be obstruction released to swing backwardly about its pivotal connection, a coupling arm pivoted to the frame, a yoke on the coupling arm, a cutter bar hingedly associated with the yoke, a hand lever on the frame having connections to raise the cutter bar, a foot lever mounted on the raise the cutter bar, a foot lever mounted on the tractor having flexible connection with the hand lever to assist the hand lever in raising the bar, and means whereby the levers are disconnected from each other when the mower frame is released and swings back.

4. A mower attachment for a tractor having a support at its rear end, said attachment comprising a frame mounted on the support, a coupling arm pivoted to the frame, a yoke on the coupling arm, a cutter bar hingedly associated with the yoke, a lever on the frame having connections to raise the cutter bar, a second lever mounted on the tractor, a flexible element connected between the two levers so that operation of the second lever assists the first lever when the two are conjointly operated to raise the bar, and means to keep the flexible element taut.

5. A mower attachment for a tractor having a support at its rear end, said attachment comprising a frame mounted on the support, a coupling arm pivoted to the frame, a yoke on the coupling arm, a cutter bar hingedly associated with the yoke, a hand lever on the frame having connections to raise the cutter bar, a foot lever on the tractor, a chain connected between the two levers whereby the foot lever may be used to assist the handle lever in raising the bar, and means to keep the chain connection taut.

6. A mower attachment for a tractor having a support at its rear end, said attachment comprising a frame pivotally connected at one point to the support and releasably connected at another point to the support whereby the frame may be obstruction released to swing backwardly about its pivotal connection, a coupling arm pivoted to the frame, a yoke on the coupling arm, a cutter bar hingedly associated with the yoke, a hand lever on the frame having connections to raise the cutter bar, a foot lever mounted on the tractor, a flexible connection between the two levers whereby the foot lever may be used to assist the hand lever in performing its function, means to maintain the flexible connection normally taut, and means whereby the flexible connection automatically disconnects from one of the levers when the mower frame is released and swings back.

7. A mower attachment for a tractor having a support at its rear end, said attachment comprising a frame pivotally connected at one point to the support, a transverse coupling arm pivoted to the frame about a longitudinal axis, a coupling yoke rockably carried on the free end of the arm, a cutter bar connected to the yoke, a coupling element pivotally connected at one end and releasably connected at its other end between the yoke and support, said releasable connection freeing the mower and its frame for rearward swinging movement when the bar encounters an obstruction, and means to support the coupling element clear of the ground when the mower is released.

8. A mower attachment for a tractor having a support at its rear end, said attachment comprising a frame pivotally connected at one point to the support, a transverse coupling arm pivoted to the frame about a longitudinal axis, a coupling yoke rockably carried on the free end of the arm, a cutter bar connected to the yoke, a coupling element pivotally connected at one end to the yoke and releasably connected at its other end to a fixed point, said releasable connection freeing the mower and its frame for rearward swinging movement when the bar encounters an obstruction, and means to support the coupling element clear of the ground when the mower is released.

9. A mower having a supporting frame, a coupling arm pivoted to the frame on a longitudinal axis and extending transversely of the frame, a yoke rockably carried at the free end of the coupling arm, a cutter bar hingedly associated with the yoke, a knife on the bar, a mower flywheel in proximity to the pivot of the arm, and a pitman connected to the flywheel to operate the knife, said coupling arm having a bend therein to enable removal of the pitman from the flywheel without having to disconnect the arm.

10. A mower having a supporting frame, a coupling arm pivoted to the frame on a longitudinal axis and extending transversely of the frame, a yoke rockably carried at the free end of the coupling arm, a cutter bar hingedly associated with the yoke, a knife on the bar, a mower flywheel turning on a longitudinal axis adjacent the pivot of the coupling arm, and a pitman connected to the flywheel to operate the knife, said coupling arm being bent downwardly to enable ready removal of the pitman from the flywheel without removing the coupling arm.

11. A mower attachment for a tractor having a support at its rear end, said attachment comprising a frame pivotally connected to the support, a coupling arm connected to the frame, a yoke on the arm, a cutter bar connected to the yoke, said mower attachment releasably connected to a fixed point on the tractor and releasable when the mower hits an obstruction to enable the mower and its frame to swing back about its pivot, and a member on the mower frame adapted to embrace the support when the mower attachment is in normal position to steady the mower structure in operation.

12. A mower attachment for a tractor having a U-shaped support at its rear end, said attachment comprising a frame pivotally connected to the support, a coupling arm connected to the frame, a coupling yoke rockably mounted on the arm, a cutter bar connected to the yoke, means releasably connecting the mower attachment to another point on the support, said means being releasable when the cutter bar encounters an obstruction, and a U-shaped member on the mower frame embracing a portion of the U-shaped support to steady the mower in its cutting position.

13. A mower attachment for a tractor having a power take-off shaft and a support at its rear end, said mower attachment comprising a frame connected to the support, a coupling arm pivotally mounted on the frame, a yoke rockably mounted on the free end of the coupling arm, a cutter bar connected with the yoke, an upright gear box on the frame, an upper shaft in the box connected to the power take-off shaft, a lower shaft in the box, a flywheel outside the box and driven by the lower shaft, a pitman driven by the flywheel, a knife on the bar driven by the pitman, an intermediate shaft in the box, and gearing in the box operatively connecting the shafts in the box.

CHARLES F. CRUMB.
SAMUEL E. HILBLOM.